(12) United States Patent
Folgarelli

(10) Patent No.: US 9,201,292 B1
(45) Date of Patent: Dec. 1, 2015

(54) CAMERA MOTION DAMPING

(71) Applicant: Michael Nevin Folgarelli, Burbank, CA (US)

(72) Inventor: Michael Nevin Folgarelli, Burbank, CA (US)

(*) Notice: Subject to any disclaimer, the term of this patent is extended or adjusted under 35 U.S.C. 154(b) by 0 days.

(21) Appl. No.: 14/622,298

(22) Filed: Feb. 13, 2015

(51) Int. Cl.
*G03B 17/56* (2006.01)

(52) U.S. Cl.
CPC .................................. *G03B 17/561* (2013.01)

(58) Field of Classification Search
CPC ...................................................... G03B 17/561
See application file for complete search history.

(56) References Cited

U.S. PATENT DOCUMENTS

| | | | |
|---|---|---|---|
| 4,535,998 A * | 8/1985 | Katz | F16J 15/3268 188/322.17 |
| 4,645,320 A | 2/1987 | Muelling et al. | |
| 5,383,645 A | 1/1995 | Pedut et al. | |
| 5,897,223 A | 4/1999 | Tritchew et al. | |
| 8,434,950 B1 * | 5/2013 | Wawro | G03B 15/006 248/121 |
| 8,714,744 B2 * | 5/2014 | Greaves | F16M 11/04 348/373 |
| 2007/0127912 A1 | 6/2007 | Jones et al. | |
| 2014/0288694 A1 * | 9/2014 | Wagner | F16M 11/18 700/213 |

* cited by examiner

*Primary Examiner* — W B Perkey
(74) *Attorney, Agent, or Firm* — Fish & Richardson P.C.

(57) ABSTRACT

A camera motion control system has a camera mount supported by one or more rotary damper assemblies. At least one of the rotary damper assemblies has a damped axle protruding from a damping fluid housing. A diaphragm seal is affixed to and spans both the axle and the damping fluid housing to seal the damping fluid in the damping fluid housing.

20 Claims, 9 Drawing Sheets

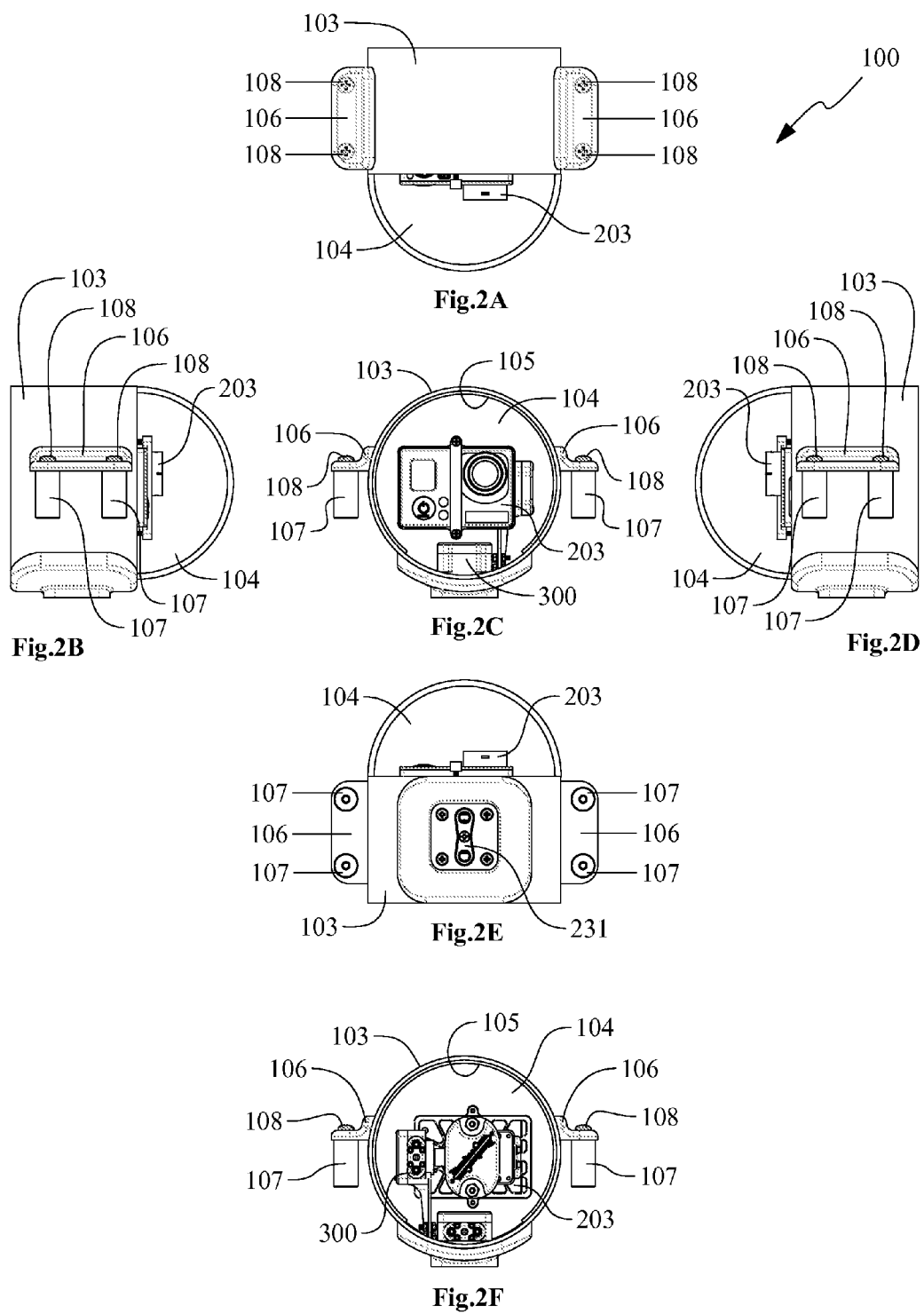

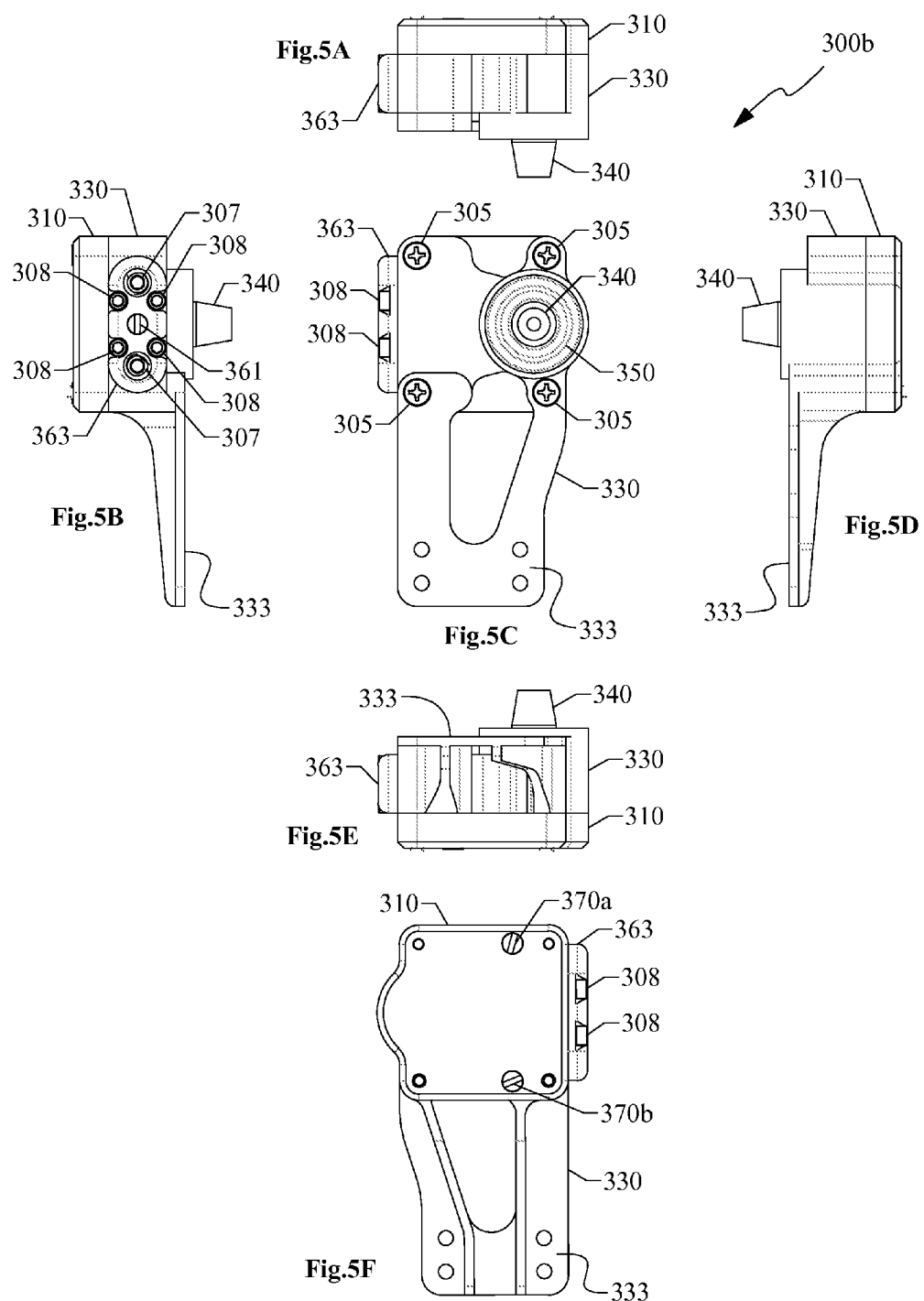

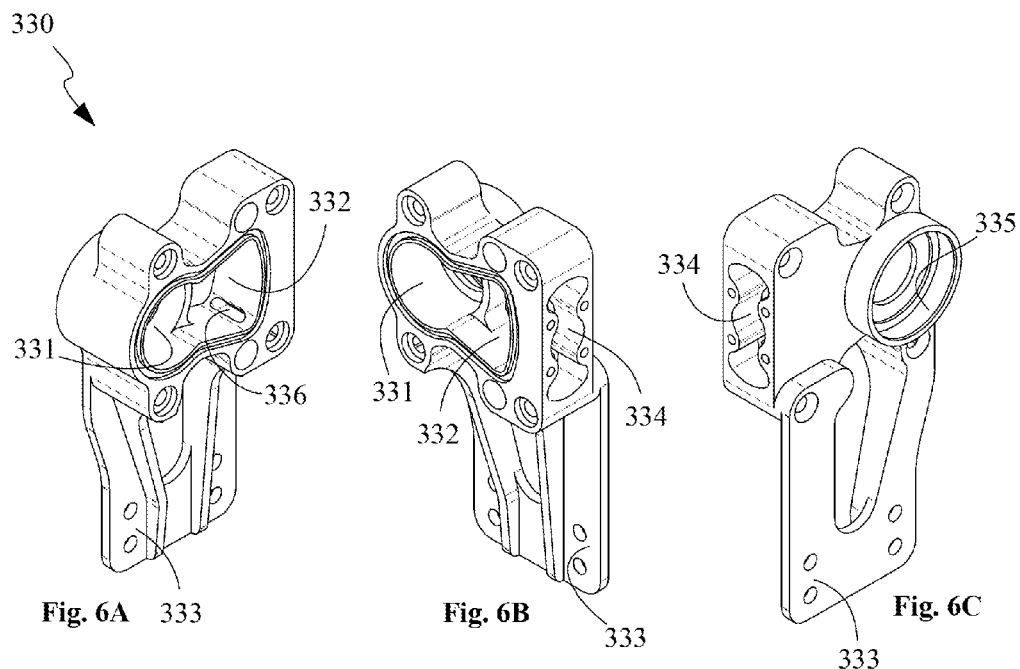
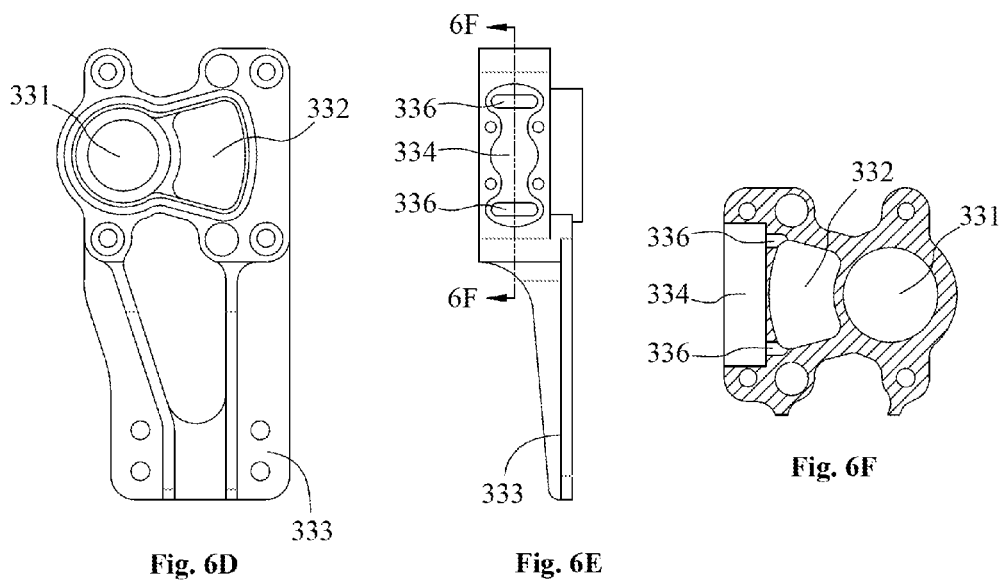

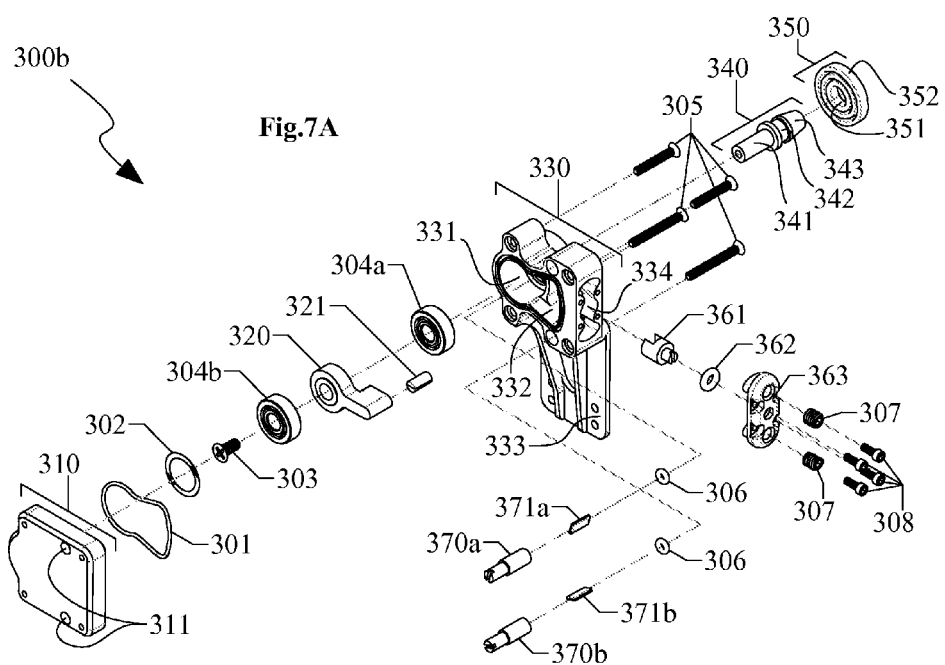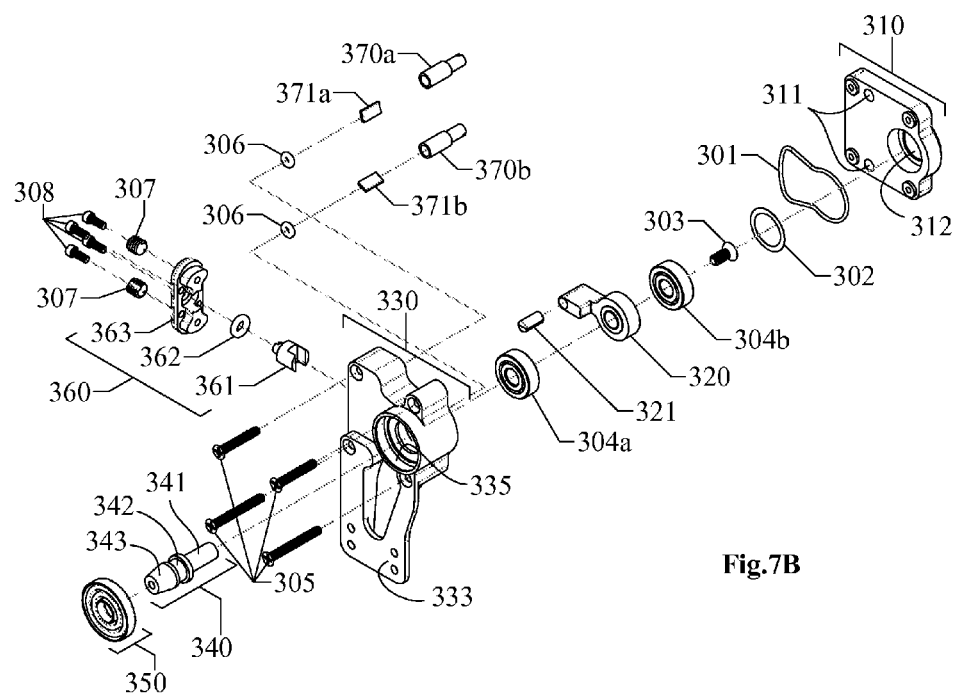

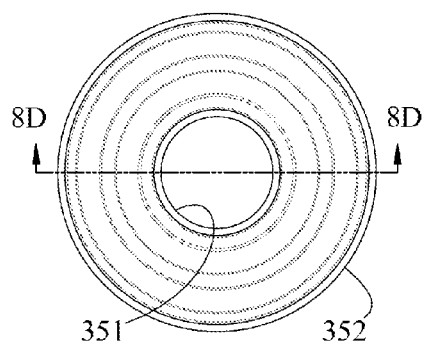
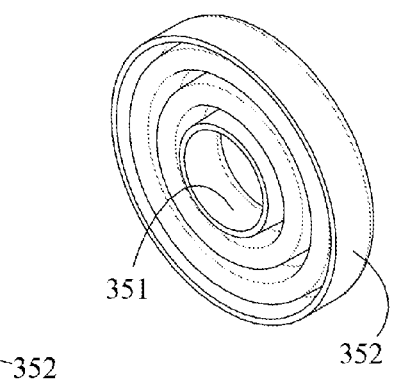
Fig. 8A  Fig. 8B  Fig. 8C
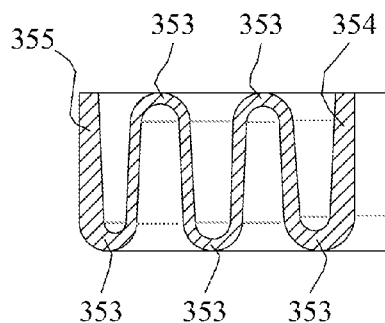
Fig. 8D
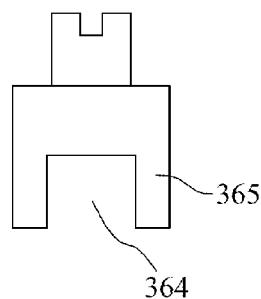
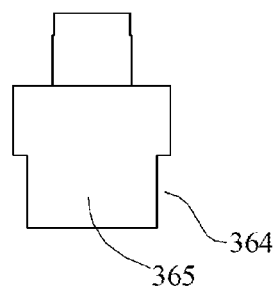
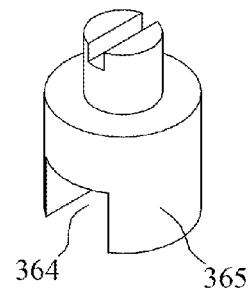
Fig. 9A  Fig. 9B  Fig. 9C

CAMERA MOTION DAMPING

BACKGROUND

The concepts herein relate to damping motion of a camera, for example, when it is mounted to a moving object, such as a vehicle, person, animal or other thing.

Filming video from a moving object can often produce shaky or blurred images as movement of the object is transmitted to the camera. Camera stabilization techniques, both mechanical and software, have been used to reduce the effects of motion on images, particularly video, recorded by the camera. One difficulty in implementing camera stabilization using mechanical methods is friction, both static (stiction) and dynamic, in the moving parts of the system. Friction is more of an issue for lighter weight cameras, because the friction is greater in proportion to the weight of the camera than with heavier cameras. Therefore, software stabilization is relied on more for such light weight cameras.

DESCRIPTION OF DRAWINGS

FIG. 1A is a front, topside perspective view, FIG. 1B is a front, underside perspective view, FIG. 1C is a rear, topside perspective view, and FIG. 1D is a rear, underside perspective view.

FIGS. 2A-2F are orthographic projections of the exemplary camera motion control system of FIGS. 1A-1D. FIG. 2A is a top view, FIG. 2B is a left side view, FIG. 2C is a front view, FIG. 2D is a right side view, FIG. 2E is a bottom view and FIG. 2F is a rear view.

FIGS. 5A-5F are orthographic projections of a rotary damper assembly of the exemplary camera motion control system of FIGS. 1A-1D. FIG. 5A is a top view, FIG. 5B is a left side view, FIG. 5C is a front view, FIG. 5D is a right side view, FIG. 5E is bottom view and FIG. 5F is a rear view.

FIGS. 6A-6F are various views of a part of the housing of a rotary damper assembly of the exemplary camera motion control system of FIGS. 1A-1D. FIGS. 6A-6C are perspective views, FIG. 6D is a rear view, FIG. 6E is a left side view, and FIG. 6F is a cross-sectional view taken along 6F-6F in FIG. 6E.

FIGS. 7A and 7B are exploded perspective views of a rotary damper assembly of the camera motion control system of FIGS. 1A-1D. FIG. 7A is an exploded, rear perspective view and FIG. 7B is an exploded, front perspective view.

FIG. 8A-8D are various views of a diaphragm seal for use in the rotary damper assembly of the camera motion control system of FIGS. 1A-1D. FIG. 8A is a front orthographic view, FIG. 8B is a right side projected view, FIG. 8C is a perspective view, and FIG. 8D is a half cross-sectional view taken along 8D-8D in FIG. 8A.

FIGS. 9A-9C are various views of a valve in the rotary damper assembly of the camera motion control system of FIGS. 1A-1D. FIG. 9A is a front side view, FIG. 9B is a right side view and FIG. 9C is a perspective view.

Like reference symbols in the various drawings indicate like elements.

DETAILED DESCRIPTION

The concepts herein encompass a camera motion control system. The camera motion control system can be implemented to have low friction in the moving parts of the system. Because of the low friction, the concepts herein can be used both with heavy and light weight cameras, including cameras too lightweight to have been effectively stabilized using prior camera motion control systems. Moreover, the camera motion control system can be implemented to be entirely passive, not requiring a power source or an electronic controller to operate. Rather, the camera motion control system is implemented with hydraulic rotary damper assemblies that hydraulically damp rotation of an axle. The concepts herein encompass non-contact rotary damper assemblies where the hydraulic damping is achieved without contact and with minimal friction, because the only contact between the moving components of the assembly and the stationary components is at the bearings supporting the axle and the seal sealing the damper housing to the axle (i.e., the seal sealing the damping fluid in the damper housing). The seals can be diaphragm seals formed as a continuous, unbroken piece spanning the axle and the housing of the assembly. The diaphragm seal forms a fluid tight static seal on the axle and on the housing, and deforms to allow rotation of the axle.

Figure 1A:
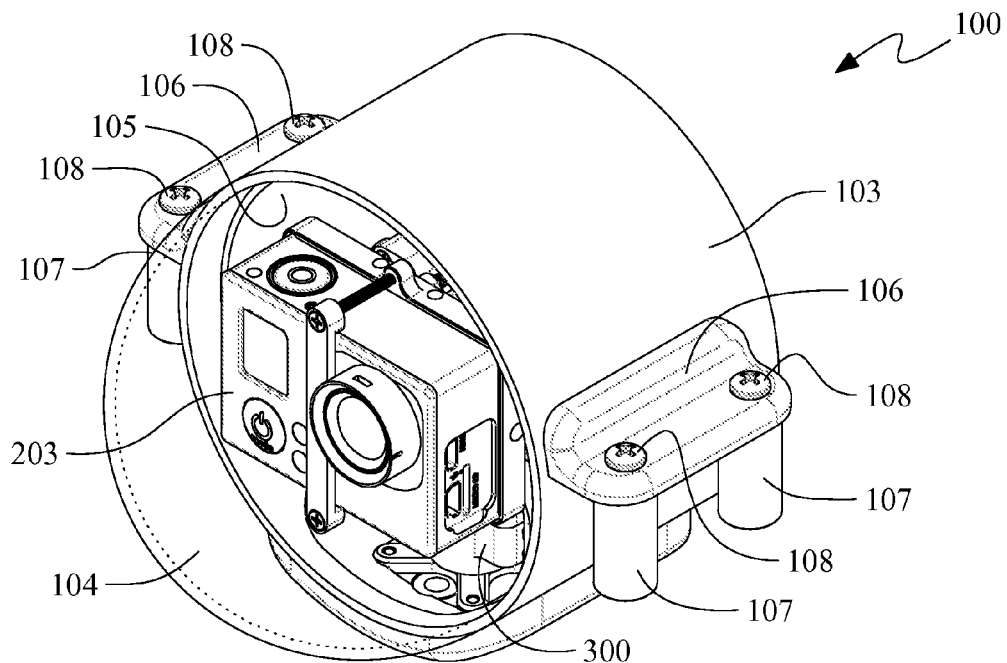
FIGS. 1A-1D are perspective views of a camera motion control system carrying a camera.
Figure 1B:
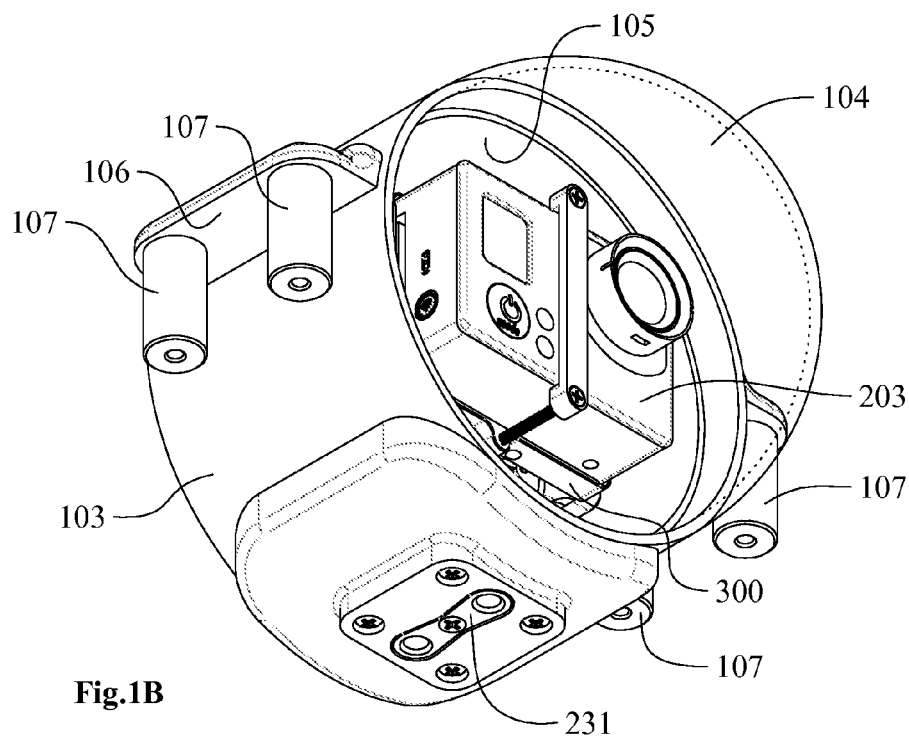
Figure 1C:
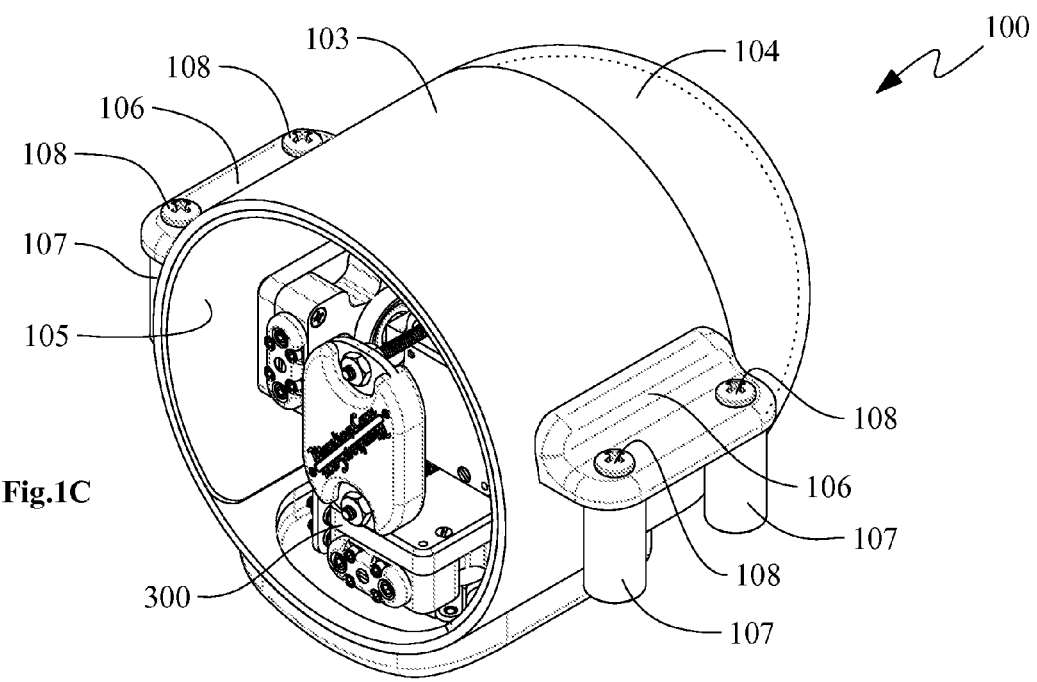
Figure 1D:
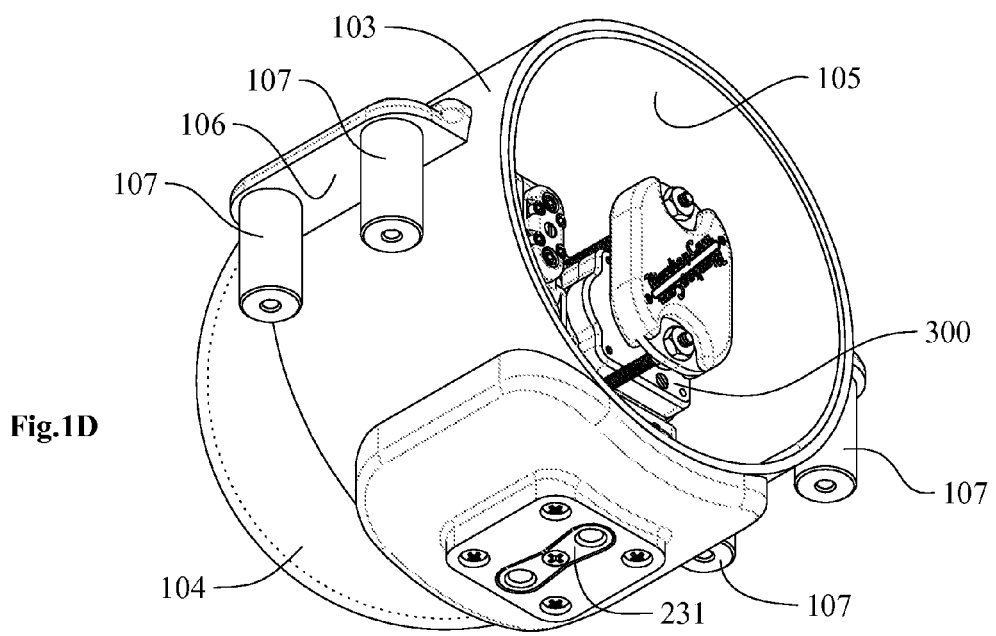
Figure 3:
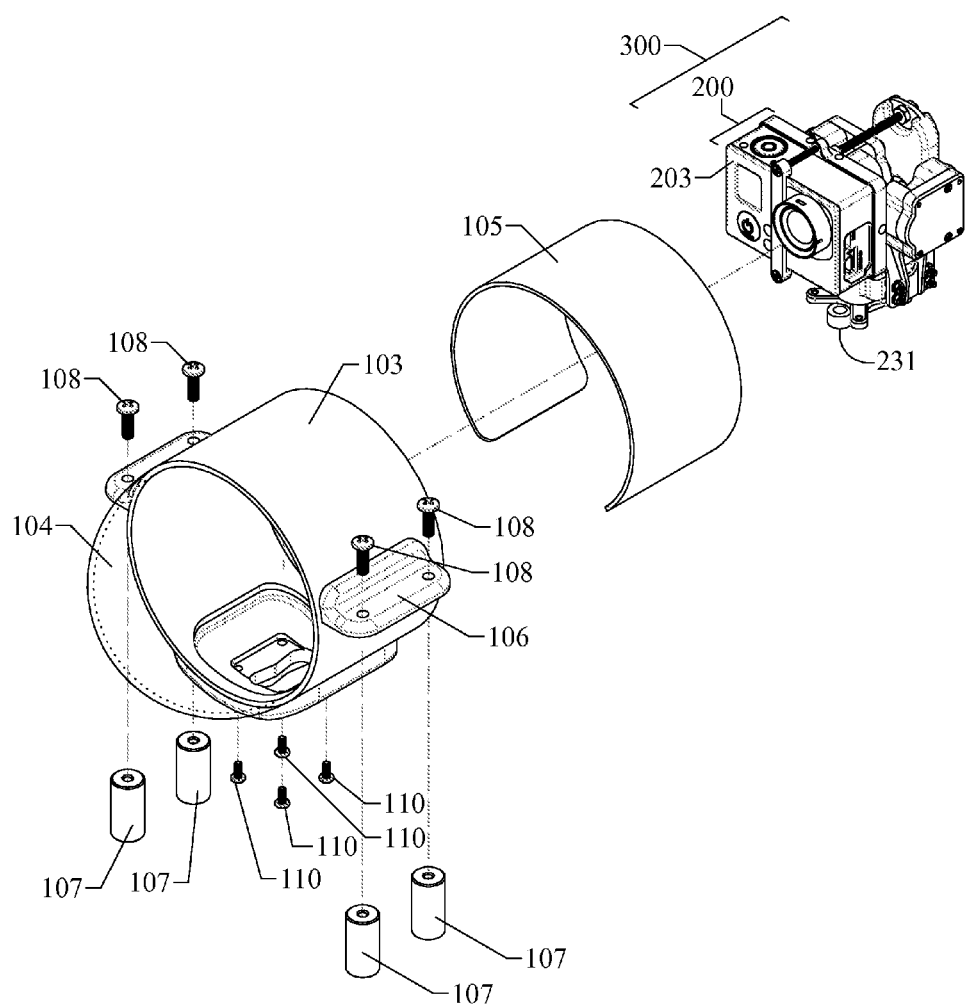
FIG. 3 is an exploded, front perspective view of the camera motion control system of FIGS. 1A-1D, showing the camera and rotary damper assemblies removed from the housing.

Referring first to FIGS. 1A-1D, FIGS. 2A-2F, and FIG. 3 an exemplary camera stabilizer, i.e., camera motion control system 100, is shown carrying a camera 203. The concepts herein are applicable to still cameras, but are especially to video cameras. As noted above, FIG. 1A is a front, topside perspective view, FIG. 1B is a front, underside perspective view, FIG. 1C is a rear, topside perspective view, and FIG. 1D is a rear, underside perspective view. FIGS. 2A-2F are orthographic projections of the exemplary camera motion control system 100, where FIG. 2A is a top view, FIG. 2B is a left side view, FIG. 2C is a front view, FIG. 2D is a right side view, FIG. 2E is a bottom view and FIG. 2F is a rear view. FIG. 3 is an exploded, front perspective view of the camera motion control system of FIGS. 1A-1D, showing the camera and rotary damper assemblies removed from the housing and the mounting stations removed from the flanges.

The camera motion control system 100 includes an exterior housing 103 that encloses the camera 203 and multiple rotary damper assemblies 300 that carry the camera 203 relative to the housing 103. The housing 103 has a transparent portion 104 that allows the camera 203 visibility out of the housing 103. In certain instances, the transparent portion 104 is polycarbonate and/or another highly transparent polymer, while the remainder of the housing 103 is aluminum and/or polymer. Although the housing 103 is shown as generally cylindrical, with a hemispherical transparent portion 104, the housing 103 and the transparent portion 104 can take other shapes. Also, although the figures show the housing 103 with an open back, in other instances, the housing 103 can fully enclose the camera 203 and the rotary damper assemblies 300 from the surroundings, and be dust, air and/or water tight. Also, in some instances, the housing 103 can include a damper lining 105, such as a dense foam applied to the interior of the housing 103.

The housing 103 includes a mounting system that enables the housing 103 to be attached to virtually anything, including vehicles (e.g., bicycles, motorcycles, quad all-terrain vehicles, utility task vehicles (UTVs), cars/trucks, boats, drones, aircraft or other vehicles), persons, animals, and other things. The mount can take many different forms. Two examples are shown in FIGS. 1A thru 1D The first example is outwardly extending flanges 106, one on each opposing side of the housing 103. Each flange 106 has two mounting stanchions 107 coupled to the flanges 106 (e.g., via screws 108 and/or otherwise). The stanchions 107 connect, e.g., via screws, to a generic or application specific clamp or bracket (not shown) that grips the thing to which the motion control system 100 is mounted. The stanchions 107 can be made from an elastic material in order to isolate the exemplary camera motion control system 100 from vibrations. The second example is a mounting area 231 at the base of the camera motion control system 100 that will accommodate an industry standard ¼"-20 and or a ⅜"-16 camera mounting shoe or be directly attached to anything.

Notably, due to a number of characteristics discussed in more detail below, the exemplary camera motion control system 100 can, as needed, be configured to be quite small and accommodate a light weight camera. For example, in certain configurations, the system 100 can be configured with a housing 103 of approximately 100 mm in diameter and 90 mm long to carry a camera 203 approximately 40 mm×60 mm×30 mm and approximately 75 g. Moreover, the motion control system 100 can effectively damp motion of a camera that fits within these constraints despite the camera's light weight, because the rotary damper assemblies 300 used have a very low stiction (i.e., static friction) that can be overcome by cameras weighing 200 g or less. Of course, the housing 103 size can be varied to accommodate many different camera sizes, and need not be small. The motion control system 100 is passive, in that it has no motors or actuators, sensors or controllers and needs no power to operate (i.e., it is unpowered). Rather, as will be discussed in more detail below, the system 100 relies on balance of the components and a neutral positioning torque produced by magnets and/or a diaphragm seal that is damped by a damping fluid.

Figure 4:
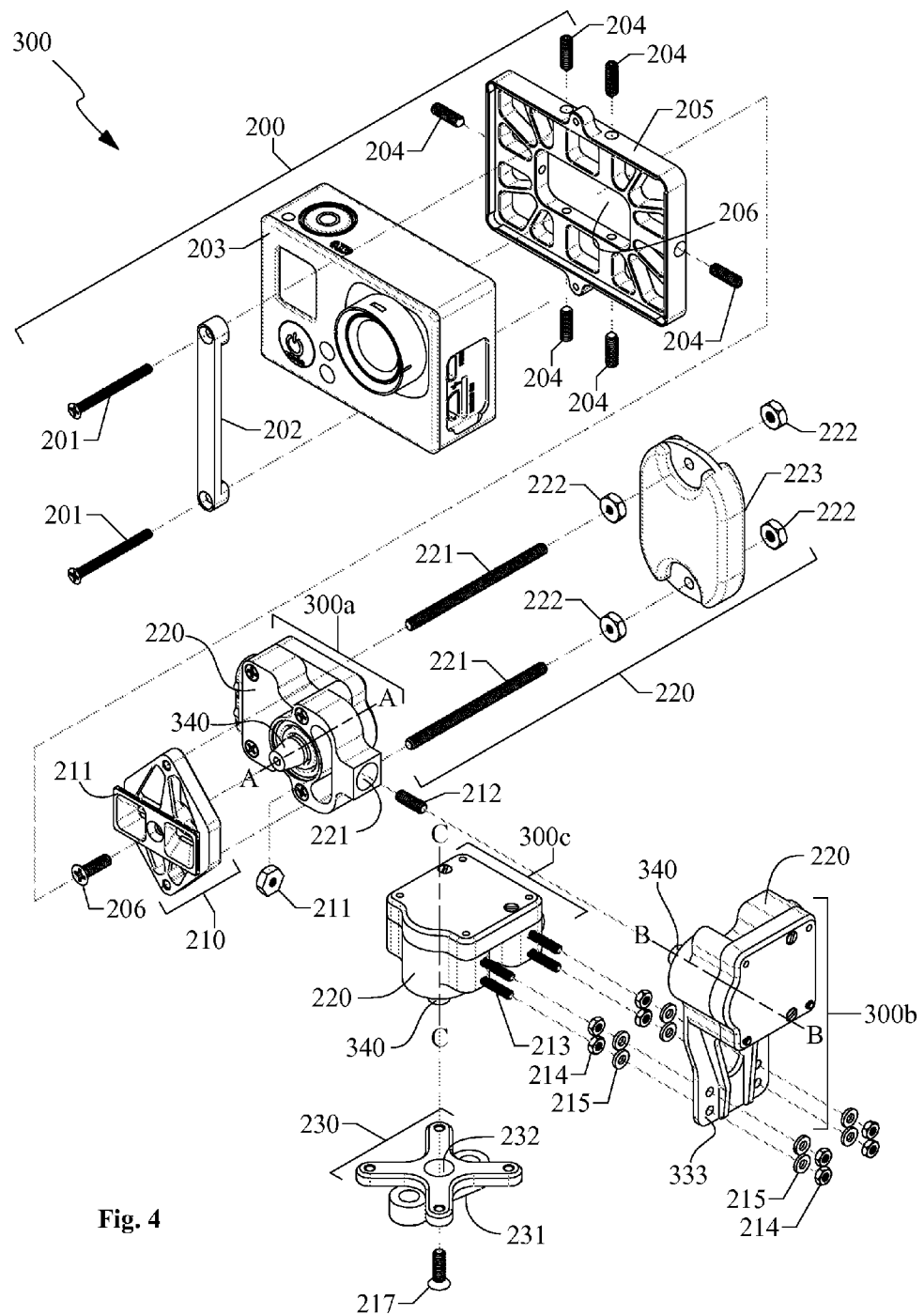
FIG. 4 is another exploded front perspective view of the camera motion control system of FIGS. 1A-1D, omitting the housing, and showing the camera and rotary damper assemblies.

Referring now to FIG. 4, the exemplary camera motion control system 100 is shown in a front perspective exploded view, omitting the housing 103 to better show the individual rotary damper assemblies 300a, 300b, 300c and how they carry the camera 203. The camera 203 is affixed to a camera mount 200 that securely holds the camera. The camera mount 200 can take a number of different forms, but in FIG. 4 the camera mount 200 is shown including a generally rectangular back mount plate 205 and a bar clamp 202 adjustably attachable to the back mount plate 205 (e.g., via screws 201 and/or otherwise). The camera 203 is set abutting the back mount plate 205 and the bar clamp 202 placed over the camera 203, so that the camera 203 is between the back mount plate 205 and the bar clamp 202. The bar clamp 202 is then affixed to the back mount plate 205 in a position that frictionally engages and securely holds the camera 203 between the bar clamp 202 and the back mount plate 205.

The back mount plate 205 mounts to a counterweight assembly 220 that includes an adapter slider 210 coupled in spaced apart relation (e.g., via threaded rods 221 and/or otherwise) to a counterweight 223. Additionally, the position of the counterweight 223 relative to the adapter slider 221 is adjustable. The counterweight 223 is sized and positioned to provide the center of mass of the camera 203, camera mount 200 and counterweight assembly 210 at a specified location outside of the camera 203 and between the camera 203 and the counterweight 223. Weights of different cameras 203 can be accounted for by substituting different weight counterweights 223 and/or by adjusting the position of the counterweight 223 nearer or further from the camera 203. The back mount plate 205 includes a central opening 206 that loosely internally receives a protrusion 211 of the adapter slider 210. The protrusion 211 extends out of plane from a generally planar surface of the adapter slider 210, so that the planar surface of the adapter slider 210 abuts a corresponding planar surface of the back mount plate 205 supporting the slider 210 relative to the back mount plate 205 when the protrusion 211 is received in the central opening 206. The protrusion 211 is clamped between multiple set screws 204 that thread from lateral side surfaces of the back mount plate 205 into the central opening 205 to abut lateral side surfaces of the protrusion 211. Six set screws 204 are shown, but fewer or more could be provided.

In addition to clamping the protrusion 211, the set screws 204 enable adjusting the lateral position of the counterweight 223 relative to the camera 203 to account for a center of mass of the camera 203 that is not laterally centered in the camera 203. For example, with the protrusion 211 tightly clamped between the set screws 204, the set screw or screws 204 on one side of the back mount plate 205 can be loosened and the set screw or screws 204 on the opposing side of the back mount plate 205 tightened to shift the adapter slider 210 laterally towards the set screw or screws 204 that were loosened. Shifting the protrusion 211 laterally in the central opening 205 shifts the position of the counterweight 223 laterally relative to the back mount plate 205 and camera 203. Additionally, lateral position of the camera 203 can be adjusted simply by clamping it at a different location with the bar clamp 202. Notably, FIG. 4 shows the protrusion 215 and the central opening 205 both being generally rectangular, with set screws 204 on each side of the rectangle so that the position of the adapter slider 210 relative to the back mount plate 205 can be adjusted in two perpendicular directions. However, other configurations are possible.

In FIG. 4, three rotary damper assemblies 300a, 300b, 300c are shown supporting the camera 203 relative to the exterior housing 103 of the camera motion control system 100. Each of the rotary damper assemblies 300a, 300b, 300c includes a rotationally damped axle 340 protruding from a damping fluid housing 220 and carried to rotate relative to the housing 220. The rotary damper assemblies 300a, 300b, 300c are coupled relative to each other so that their respective axles 340 extend in and rotate about one of three mutually perpendicular and intersecting axes—A-A, B-B and C-C. In particular, the axle 220 of a first rotary damper assembly 300a adjacent the camera mount 200 is affixed to the adapter slider 210 of the mount 200 (e.g., by being drawn into a mating tapered bore on the mount 210 by screw 206 or otherwise) and extends in axis A-A. Thus, the first rotary damper assembly 300a carries the camera 203, mount 200 and counterweight assembly 220 to rotate on the axis A-A and damps movement in this direction, i.e., roll. The axle 340 of a second rotary damper assembly 300b is affixed to the damping fluid housing 220 of the first rotary damper assembly 300a (e.g., by being secured into a boss with a tapered bore 221 of the housing 220 by means of a draw stud 212 and nut 211 or otherwise) and extends in axis B-B. The second rotary damper assembly 300b carries the camera 203, mount 200, counterweight assembly 220 and first rotary damper assembly 300a to rotate on the axis B-B and damps movement in this direction, i.e., pitch. Finally, the housing 220 of the third rotary damper assembly 300c is affixed to a bracket 333 of the housing 220 of the second rotary damper assembly 300b (e.g., via studs 213, nuts 214, washers 215, and/or otherwise). The bracket 333 can be formed integrally with the housing 220 or affixed to the housing (e.g., via screws and/or otherwise). The axle 340 of the third rotary damper assembly 300c extends in axis C-C and is affixed to a base 230 with screw 217. As seen in FIG. 1A, the base 230 is affixed to the exterior housing 103 of the camera motion control system 100. Thus, the third rotary damper assembly 300c carries the camera 203, mount 200, counterweight assembly 220 and two other rotary damper assemblies 300a, 300b to rotate on the C-C axis and damps movement in this direction, i.e., yaw. As shown in FIG. 4, the camera is coupled to the mount 200 so that the relative x-y-z coordinate system of the camera 203 (where x-y is the camera's relative horizontal and z is the camera's vertical) is generally aligned with the axis A-A, B-B and C-C, respectively. While it is possible, and not excluded from the concepts herein, to provide fewer or more rotary damper assemblies 300a-c (and damp movement in fewer or more axis), the three degrees of freedom of rotary damper assemblies 300a-c is an efficient manner of damping against movement in all directions.

FIGS. 5A-5F and 6A-6B depict the rotary damper assembly 300b. Rotary damper assemblies 300a-300c are preferably (although not necessarily) identically constructed, varying only in the external configuration of their housing 220. For example, rotary damper assembly 300a includes a boss with a tapered bore 221 to which the axle 340 of another damper assembly can affix, but lacks the bracket 333. Rotary damper assemblies 300b and 300c lack the boss 221, but rotary damper assembly 300b includes the bracket 333.

FIGS. 5A-5F are orthographic projections of a non-contact type, rotary damper assembly of the exemplary camera motion control system of FIGS. 1A-1D. FIG. 5A is a top view, FIG. 5B is a left side view, FIG. 5C is a front view, FIG. 5D is a right side view, FIG. 5E is bottom view and FIG. 5F is a rear view. FIGS. 6A-6F are various views of a part of the housing of the rotary damper. FIGS. 6A-6C are perspective views, FIG. 6D is a rear view, FIG. 6E is a left side view, and FIG. 6F is a cross-sectional view taken along A-A in FIG. 6E. Finally, FIGS. 7A and 7B are exploded perspective views of the rotary damper assembly of the camera motion control system of FIGS. 1A-1D. FIG. 7A is an exploded, rear perspective view and FIG. 7B is an exploded, front perspective view.

The damping fluid housing 330 internally defines a damping fluid chamber 332 that contains a damping fluid. The damping fluid housing 330 is formed in two parts 330, 310 that, when the rotary damper assembly 300b is assembled, are affixed together (e.g., via screws 305 and/or otherwise). One part 330 includes the damping fluid chamber 332 and the other part 310 caps the chamber 332. However, in other instances, the chamber 332 can be split between the parts 310, 330. A seal 301 circumscribes the chamber 332 and abuts both parts 310, 330 to seal the chamber 332 against leakage of the damping fluid from the chamber 332 when the parts 310, 330 are affixed together.

The housing part 220 has a through-hole 331 through which the axle 340 is received. The through-hole 331 coincides with the damping fluid chamber 332. The through-hole 331 receives a bearing 304a, and the housing part 310 receives a bearing 304b. The bearings 304a, 304b (shown as cartridge bearings), in turn, receive the axle 340 and carry the axle 340 to rotate relative to the housing 220. In certain instances, the bearing 304a is press fit into the through-hole 331 and the bearing 304b is press fit into a pocket in the housing part 312. In certain instances there may be the use of a bonding agent to affix the bearings 340a,340b to their respective positions on the axle 340 and or the housing 330 and or cover 310.

The axle 340 is sized in length so that its tapered portion 343 extends out from the damping fluid housing 220 when the axle 340 is fully received in the bearings 304a, 304b. A vane 320 is affixed to the axle 340 to rotate with the axle 340. In certain instances, the vane 320 is press fit to portion 341 of the axle 340. The vane 320 extends radially outward from the axle 340, and the chamber 332 is sized to allow the axle 340 and vane 320 to rotate through a specified range of motion before contacting the walls of the chamber 332. In certain instances, that range of motion is 30°, but could be greater or less.

The vane 320 has an axial height approximately equal to the height of the damper fluid chamber 332 (when the housing parts 330, 310 are assembled) so that the axial ends of the vane 320 fits in close passage to the end walls of the chamber 332 without contacting the end walls of the chamber 332. Similarly, the vane 320 extends radially from the axle 340 to the sidewall of the damper fluid chamber 332 so that the radial end of the vane 320 fits in close passage to the sidewall of the fluid chamber 332 without contacting the sidewall of the fluid chamber 332. The sidewall of the fluid chamber 332 adjacent the radial end of the vane 320 is arced to maintain this close passage throughout the range of motion of the vane 320 and axle 220. The close passage between the vane 320 and the walls of the chamber 332 is sized to create a dynamic seal that substantially seals against passage of damping fluid from one side of the vane 320 to the other as the vane 320 is moving in the damper fluid chamber 332. A wiper seal, such as one that contacts both the vane 320 and the walls of the damper fluid chamber 332, is not necessary, but could alternatively be provided. However, such contact adds undesirable friction to the operation of the rotary damper assembly 300b.

The housing 330 has a pair of ports 336 that connect the fluid chamber 332 to a passage 334. The fluid chamber 332, is open to the chamber 334 on both sides of the vane 320 to fluidly connect both sides of the vane 320 throughout the range of motion of the vane 320 and axle 340. As the axle 340 is rotated, the vane 320 moves in the chamber, and the volume of the chamber 332 on one side of the vane 320 (the side in the direction of rotation) decreases while the volume on the other side increases. Damper fluid displaced from the decreasing volume can flow to the increasing volume, i.e., from one side of the vane 320 to the other, through ports 336 and the passage 334. The passage 334 includes an adjustable flow restriction 361 that can be adjusted to increase or decrease the restriction to flow through the passage 334, and in turn, increase or decrease the damping provided by the damper fluid on the vane 320 and axle 340. The change in damping, of course, comes from the increased resistance of the fluid flowing from the decreasing volume to the increasing volume acting on the vane 320.

In FIG. 6B, the passage 334 is shown open, capped by a plate 363 (affixed by screws 308 or otherwise) that carries a valve 361 retained to protrude into and restrict flow through the passage 334. As best seen in FIGS. 9A-9C, the valve 361 has a closure 365 with a through opening 364 that when misaligned with the passage 334 restricts flow through the passage 334, and when aligned with the passage 334 provides less restriction to flow through the passage 336. The more misaligned the through-opening 364 is to the passage 334, the greater restriction the valve 361 provides to flow through the passage 334. The closure 365 is generally cylindrically shaped and retained by plate 363 and/or otherwise to allow the cylinder shape to rotate in the remainder of the housing 330. The through-opening 364 is transverse to the cylinder's longitudinal axis, so that that the closure can be rotated in relation to the passage 334 to align/misalign the through-opening 364 with the passage 334. In addition, the plate 363 includes screws 307 that one screw allows filling the housing 330 with a damping fluid, the other screw allows escape of displaced air during the filling process. The screws 307, when tightened after the filling process, seals the damping fluid within the housing.

The damper fluid in the chamber 332 is selected to provide a specified degree of damping to the axle 340 via the interaction of vane 320, the damper fluid and the restriction in the passage 334. In certain instances, the damper fluid is a hydraulic shock oil of a specified weight and viscosity. Fluids with higher viscosity provide greater damping, because they are restricted more by the restriction in the passage 334. Fluids with lower viscosity provide less damping.

The radial end of the vane 320 carries a magnet 321 with its poles oriented laterally towards opposing sidewalls of vane 320 and the chamber 332. The housing 330 has two magnets 371a, 371b, one near each of the opposing sidewalls of the chamber 332, with their poles oriented laterally so their magnetic fields interact with the magnetic field of the magnet 321 in the vane 320. The magnets 371a, 371b are positioned near enough to the chamber 332 to act on the magnet 321 in the vane 320, and are typically oriented with the north pole of one magnet 371a, 371b toward the north pole of the magnet 321 in the vane 320 and the south pole of the other magnet 371a, 371b toward the south pole of the magnet 321 in the vane 320. By having opposing poles, the magnets 321, 371a, 371b tend to repel the vane 320 from the sidewalls of the chamber 332 and maintain the vane 320 toward the center of the chamber 332. In doing so, the magnets 321, 371a, 371b tend to maintain the axle 340 in a specified neutral position (typically, though not necessarily at center) and tend to drive the axle 340 to this position when it is not. In other words, the magnets 321, 371a, 371b apply a neutral positioning torque to the axle 340. In FIGS. 7A and 7B, the magnets 371a, 371b are shown as being generally rectangular with the cylinder's longitudinal axis oriented parallel to the rotational axis of the axle 340 (here, axis B-B), so that the magnets 371a, 371b can be rotated in relation to the chamber 332 to orient their poles more or less toward the magnet 321 to adjust how strongly the magnets 371a, 371b repel the magnet 321, and thus, how strongly the magnets 371a, 371b tend to center the vane 320 and axle 340. Additionally, the magnets 371a, 371b can be independently rotated to adjust, relatively, how strongly each magnet 371a, 371b repels the magnet 321 to adjust the neutral position of the vane 320 and/or to account for differences in torque on the axle 340 in different directions. For example, referring briefly back to FIG. 4, the axle 340 of rotary damper assembly 300b is subject to differential torque in supporting the weight of the camera 203 and rotary damper assembly 300a. The independent adjustability of the magnets 371a, 371b enables compensating for this difference in torque by allowing the adjustability to apply a greater repelling force to the vane 320 opposite the direction of and supporting the greater torque.

The through-hole 331 of the housing part 330 is sealed to the axle 340 by a diaphragm seal 350 to prevent damper fluid from leaking from the chamber 332. The diaphragm seal 350 is affixed to the housing part 330, for example, as a friction fit to an inner surface of the through-hole 332 that is tight enough that the outer perimeter remains stationary, without slipping, to the housing part 330 when the axle 340 is rotated through its range of motion. The diaphragm seal 350 is affixed to the outer surface of the axle 340, for example, as a friction fit around the axle portion 342 that is tight enough that the interior perimeter of the diaphragm seal 350 moves with the rotation of the axle 340 through its range of motion without slipping. In the instance of a polymer diaphragm seal 350, the friction fit can be achieved by making the hole in the seal 350 that receives the axle 340 slightly smaller in diameter than the axle 340 where the friction fit will be achieved. Also an adhesive bond may also be used to seal the diaphragm to the axle portion 342 and to the through hole portion 335 of the housing 330.

The rotary damper assembly 300b is of a non-contact type, in that the moving parts of the assembly do not contact the stationary parts, except at the bearings 304a, 304b and the seal 350. Thus, neither the axle 340 nor the vane 320, nor any component associated therewith, contact the housing 300 or any other stationary portion of the rotary damper assembly 300b. The non-contact arrangement provides very low friction against rotation of the axle 340.

In certain instances, the diaphragm seal 350 is formed as a single, continuous, unbroken piece that spans from contact at the axle 340 to contact the housing part 335. As a single, continuous piece, the diaphragm seal 350 does not need to slide relative to another component (e.g., the axle 340 or housing part 330) or against itself (as would occur if the seal 350 were made in multiple pieces), and thus has no sliding friction or stiction that would hamper the ability of the rotary damper assembly 300b to respond to light loading. In fact, with vane 320 not contacting the housing part 330 and the diaphragm seal 350 being a single, continuous piece, the only friction against rotation of the axle 340 comes from the bearings 304a, 304b, which have very low friction. Also, as a single, continuous piece, the diaphragm seal 350 cannot leak in the span between its interfaces with the axle 340 and the housing part 330 (as could occur if the seal 350 were made in multiple pieces). The diaphragm seal 350 forms a static seal at the interfaces with the axle 340 and the housing part 330 reducing its tendency to leak, because static seals are more effective at sealing against leakage than dynamic seals that must seal despite relative movement between the seal and the surface it is sealing against.

When the axle 340 rotates through its range of motion, the diaphragm seal 350 must circumferentially deform as the inner perimeter of the seal 350 displaces rotationally relative to the outer perimeter. The elasticity of the diaphragm seal 350 allows it to elastically deform and return back to its un-deformed state, which tends to maintain the axle 340 in the specified neutral position and drive the axle 340 to this position when it is not. In other words, the elasticity of the diaphragm seal 350 applies a neutral positioning torque to the axle 340 that additively cooperates with the neutral positioning torque applied by the magnets 321, 371a, 371b. The total neutral positioning torque applied by the diaphragm seal 350 and magnets 321, 371a, 371b is designed to be enough to support the camera in a neutral position. For example, the thickness and configuration of the seal 350, as well as its materials, can be selected to contribute a specified amount of neutral positioning torque to the total neutral positioning torque applied to the axle 340. In certain instances, the seal 350 can be sized to provide all of the neutral positioning torque and the magnets 321, 371a, 371b omitted. For example, rotary damper assemblies 300a and 300c need less neutral positioning torque than rotary damper assembly 300b (FIG. 4), and thus, in certain instances, one or both may be configured to receive all of the neutral positioning torque from its seal 350 and omit magnets 321, 371a, 371b. The magnets 371a, 371b may also be rotated into such a position as to eliminate their effect on the additive neutralizing torque provided by the seal 350 and the magnets 371a, 371b. Also the magnets 371a, 371b may be rotated to a position to reduce the total neutralizing torque to zero, in other words a free floating gimbals condition.

FIGS. 8A-8D show an example diaphragm seal 350. The seal 350 is configured as a bellows having multiple undulations 353 to provide additional material to deform and allow rotational displacement between the outer perimeter and the inner perimeter of the diaphragm seal 350. The undulations 353 are circular, concentric to each other, as well as to the axle 340. Fewer or more or no undulations 353 could be provided.

In certain instances, the thickness of the material forming the diaphragm seal 350 (whether configured as a bellows, as a flat diaphragm, or otherwise), measured perpendicular to the surface of the material, decreases as function of the radial distance from the inner perimeter to provide reduced resistance to deformation in the portions of the diaphragm seal 350 that experience the greatest deformation. In particular, the inner and outer perimeters of the diaphragm seal 350 include thick portions—a thick portion 354 where the diaphragm seal 350 affixes to the axle and a thick portion 355 where the diaphragm seal 350 affixes to the housing part 330. The thick portions 354, 355 provide a stiff interface between the diaphragm seal 350 and the axle 340 and the housing part 330, and in some instances are of the same thickness. The thick portions 354, 355 are sized so that they do not substantially strain when the axle 340 is rotated through its range of motion. Rather, the deformation of the diaphragm seal 350 is substantially concentrated in the material between the thick portions 354, 355. The thickness of the material of the diaphragm seal 350 between the thick portions 354, 355 decreases as a function of the radial distance from the axle 340. For example, for a given angular displacement of the axle 340, the diaphragm seal 350 experiences its greatest displacement and deformation nearest the housing part 330, at the greatest radius, immediately inward from the thick portion 355. Therefore, the diaphragm seal 350 is thinnest immediately radially inward from the thick portion 355 near the housing part 330. The diaphragm seal 350 experiences its least displacement and deformation nearest the axle 340, at the smallest radius, immediately outward from the thick portion 354. Therefore, the diaphragm seal 350 is thickest immediately radially outward from the thick portion 354 near the axle 340. In certain instances, the relative thickness of the diaphragm seal 350 is selected so that the material experiences the same strain (precisely or substantially) at each different radial distance from the thick portion 354. Further configuring the diaphragm seal 350 as a bellows provides additional material to facilitate deformation of the seal 350 as the axle 340 rotates through its range of motion. FIG. 8A shows example thickness dimensions; however, other dimensions could be used.

In operation, the camera motion control system 100 (FIG. 1A) is affixed to something, such as a vehicle, a person or animal or another thing and the camera 203 operated to collect images. For convenience of reference, the "something" will be discussed here as being a vehicle with a camera collecting video, but operation in connection with other things and collecting still images is similar. The weight of the camera 203 is countered by the neutral positioning torque applied to the axles 340. For example, the camera 203 is supported in roll, i.e., about axis A-A, by the neutral positioning torque on axle 340 of the rotary damper assembly 300a. The camera 203 is supported in pitch, i.e., about axis B-B, by the neutral positioning torque on axle 340 of the rotary damper assembly 300b. The camera 203 is supported in yaw, i.e., about axis C-C, by the neutral positioning torque on axle 340 of the rotary damper assembly 300c.

The specified neutral position and amount of neutral positioning torque applied to the axles 340 can be adjusted by adjusting the orientation of the magnets 371a, 371b (FIGS. 7A and 7B) relative to the magnet 321 in the vane 320. Thus, the magnets 371a, 371b of rotary damper assembly 300a can be adjusted to maintain the camera 203, when static, at a specified neutral position in roll, such as with the camera 203 y-axis perpendicular to axis C-C and/or with the camera 203 y-axis parallel to a horizontal. To minimize the neutral positioning torque needed to maintain the camera 203 in the specified neutral position, the center of mass of the camera 203 can be made to coincide with axis A-A or made as close as practical by shifting the camera 203 in the mount 200 and by adjusting the position of the back mount plate 205 relative to the adapter slider 211 with the screws 204. The magnets 371a, 371b of rotary damper assembly 300b can be adjusted to maintain the camera 203, when static, in a specified neutral position in pitch, such as with the camera 203 x-axis perpendicular to axis C-C and/or with the camera 203 x-axis parallel to horizontal. To minimize the neutral positioning torque needed to maintain the camera 203 in this specified neutral position, the center of mass of the camera 203 and counterweight assembly 200 can be made to coincide with axis C-C or made as close as practical by adjusting the position of the counterweight 223 nearer or farther to the camera 203 and/or by using different weights of counterweight 223. Finally, the magnets 371a, 371b of rotary damper assembly 300c can be adjusted to maintain the camera 203, when static, with the camera 203 x-axis pointing toward the direction to be imaged, which is typically (although not necessarily) forward. The amount of damping provided in roll, pitch and yaw can be adjusted by adjusting the valve 361 of the rotary damper assemblies 300a (roll), 300b (pitch) and 300c (yaw). Adjusting the valve 361 to provide a greater degree of flow resistance, increases the damping. Adjusting the valve 361 to provide a lesser degree of flow resistance, decreases the damping.

As the vehicle moves and changes in direction of movement, for example in steering or navigating bumps or waves or the like, that change in direction of movement will be transmitted to the camera motion control system 100. The movement is inherently resolved into the three mutually perpendicular axis A-A, B-B and C-C (FIG. 4), and manifest as torque on the axles 340 of the three rotary control dampers 300a-c. When the torque on a given axle 340 produced by the movement exceeds the neutral positioning torque, the axle 340 rotates and the rotary control damper 300a-c absorbs some or all of the movement. As a result, the movement transmitted to the camera 203 is reduced, and particularly transmission of high acceleration (high amplitude) movements can be eliminated as well as low acceleration (low amplitude) movements. Moreover, what movement is transmitted to the camera 203 is damped by the three rotor control dampers 300a-c, thus reducing shaking and blurring of the recorded video.

A number of embodiments have been described. Nevertheless, it will be understood that various modifications may be made. Accordingly, other embodiments are within the scope of the following claims.

What is claimed is:
1. A camera motion control system, comprising:
   a camera mount;
   a first rotary damper assembly, comprising:
      a damped first axle protruding from a first damping fluid housing, the first axle affixed to the camera mount extending in a first of three mutually perpendicular axis and carried to rotate relative to the first damping fluid housing; and a diaphragm seal spanning and affixed to both the first axle and the first damping fluid housing and sealing damping fluid in the first damping fluid housing;

a second rotary damper assembly comprising a damped second axle protruding from a second damping fluid housing, the second axle affixed to the first rotary damper assembly extending in a second of the three mutually perpendicular axis and carried to rotate relative to the second damping fluid housing;

a third rotary damper assembly affixed to the second rotary damper assembly and comprising a damped third axle protruding from a third damping fluid housing, the third axle extending in a third of the three mutually perpendicular axis and carried to rotate relative to the third damping fluid housing; and a base affixed to the third axle.

2. The camera motion control system of claim 1, where the diaphragm seal comprises a bellows.

3. The camera motion control system of claim 1, where the diaphragm is thinner adjacent the first axle than adjacent the housing and decreases in thickness from the first axle to the housing.

4. The camera motion control system of claim 1, where the diaphragm seal comprises a single, continuous piece spanning between contact at the first axle and contact at the first damping fluid housing.

5. The camera motion control system of claim 1, where the first rotary damper assembly comprises a vane extending radially outward from the first axle and that moves with rotation of the first axle, where the vane is sealed in the first damping fluid housing and movement of the vane is damped by the damping fluid.

6. The camera motion control system of claim 5, where the first damping fluid housing comprises a chamber containing the vane and a fluid passage in communication with the chamber on opposing sides of the vane; and where the first damping fluid housing comprises an adjustable fluid restriction in the fluid passage arranged to restrict flow of damping fluid from one side of the vane to the other side of the vane through the fluid passage when the vane moves with the first axle.

7. The camera motion control system of claim 5, comprising magnets carried by the first damping fluid housing on opposing sides of the vane, the magnets producing a magnetic field that tends to return the vane to a specified location in its range of motion.

8. The camera motion control system of claim 7, where the orientation of the magnets relative to the vane is each independently adjustable while the magnets are carried by the first damping fluid housing.

9. The camera motion control system of claim 7, where the vane comprises a magnet that produces a magnetic field that interfaces with the magnetic field of the magnets of the first damping fluid housing.

10. The camera motion control system of claim 5, where the first damping fluid housing comprises a chamber containing the vane, and where vane does not contact the damping fluid housing.

11. The camera motion control system of claim 1, where the first rotary damper assembly comprises a non-contact damper assembly.

12. The camera motion control system of claim 1, where the second and third rotary damper assemblies each comprise a diaphragm seal spanning and affixed to their respective axle and their respective damping fluid housing.

13. The camera motion control system of claim 1, where the system is entirely passive, having no motors, actuators, sensors or controllers.

14. A method, comprising:

supporting a camera using three axles carried to rotate in three mutually perpendicular directions; and damping movement of the camera by damping rotation of a first of the three axles with a fluid sealed in a first damping fluid housing by a diaphragm seal, the diaphragm seal spanning and affixed to both the first axle and the first damping fluid housing.

15. The method of claim 14, comprising damping movement of the camera with a second of the three axles with a fluid sealed in a second damping fluid housing; and damping movement of the camera with a third of the three axles with a fluid sealed in a third damping fluid housing.

16. The method of claim 14, where the diaphragm seal comprises a single, continuous piece spanning between contact at the first axle and contact at the first damping fluid housing.

17. The method of claim 16, comprising circumferentially deforming the diaphragm seal while damping movement of the camera.

18. A camera motion control system, comprising:

a camera mount;

an axle coupled to the camera mount;

a housing carrying the axle and comprising a damping fluid that damps rotation of the axle; and a diaphragm seal affixed to both the axle and the housing and sealing the damping fluid in the housing.

19. The camera motion control system of claim 18, where the diaphragm seal comprises a single, continuous piece spanning between contact at the axle and the housing.

20. The camera motion control system of claim 18, where the diaphragm seal comprises a bellows.

* * * * *